US 9,397,879 B2

(12) United States Patent
Akhtar et al.

(10) Patent No.: US 9,397,879 B2
(45) Date of Patent: Jul. 19, 2016

(54) SYSTEM, APPARATUS AND METHOD FOR ADDRESS MANAGEMENT IN A DISTRIBUTED MOBILE CORE NETWORK

(75) Inventors: Shahid Akhtar, Richardson, TX (US); Alistair Urie, Issy-les Moulineaux (FR); Colin Kahn, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 551 days.

(21) Appl. No.: 13/155,818

(22) Filed: Jun. 8, 2011

(65) Prior Publication Data

US 2012/0317268 A1 Dec. 13, 2012

(51) Int. Cl.
| G06F 15/173 | (2006.01) |
| G06F 15/16 | (2006.01) |
| H04L 12/28 | (2006.01) |
| H04L 29/12 | (2006.01) |
| H04W 88/06 | (2009.01) |
| H04W 80/00 | (2009.01) |
| H04W 48/18 | (2009.01) |

(Continued)

(52) U.S. Cl.
CPC ...... *H04L 29/12311* (2013.01); *H04L 61/2084* (2013.01); *H04L 41/08* (2013.01); *H04L 47/2433* (2013.01); *H04W 48/18* (2013.01); *H04W 80/00* (2013.01); *H04W 84/12* (2013.01); *H04W 88/06* (2013.01)

(58) Field of Classification Search
CPC ..... H04W 48/18; H04W 88/06; H04W 80/00; H04L 47/2433; H04L 41/08
USPC .................................. 709/224, 250; 370/401
See application file for complete search history.

(56) References Cited

U.S. PATENT DOCUMENTS

| 6,681,259 | B1 * | 1/2004 | Lemilainen et al. | 709/250 |
| 2003/0182410 | A1 * | 9/2003 | Balan et al. | 709/223 |

(Continued)

FOREIGN PATENT DOCUMENTS

| CN | 101388882 | 3/2009 |
| EP | 0 998 094 | 5/2000 |

(Continued)

OTHER PUBLICATIONS

S. L. Tsao and E. C. Cheng, "Energy-Conserving Always-on Schemes for a Mobile Node with Multiple Interfaces in All-IP Network," Personal, Indoor and Mobile Radio Communications, 2007. PIMRC 2007. IEEE 18th International Symposium on, Athens, 2007, pp. 1-5.*

(Continued)

*Primary Examiner* — Taylor Elfervig
(74) *Attorney, Agent, or Firm* — Harness, Dickey & Pierce, P.L.C.

(57) ABSTRACT

Embodiments of the present invention provide a system, apparatus and method for address management in a distributed mobile core network. The apparatus includes a user equipment for managing multiple addresses for connecting at least one application client of the user equipment to a respective application server via at least one network. The user equipment includes a mobile address unit configured to manage a principal address, a local macro network (LMN) address, and a local area network (LAN) address. The principal address is used for data transmissions of a first type, the LMN address is used for data transmissions of a second type, and the LAN address is used for data transmission of a third type.

19 Claims, 4 Drawing Sheets

(51) Int. Cl.
*H04L 12/24* (2006.01)
*H04L 12/851* (2013.01)
*H04W 84/12* (2009.01)

(56) References Cited

U.S. PATENT DOCUMENTS

| | | | |
|---|---|---|---|
| 2004/0009751 A1* | 1/2004 | Michaelis et al. | 455/62 |
| 2005/0089052 A1* | 4/2005 | Chen et al. | 370/401 |
| 2006/0268752 A1* | 11/2006 | Ackermann-Markes et al. | 370/260 |
| 2007/0195765 A1* | 8/2007 | Heissenbuttel et al. | 370/389 |
| 2009/0168788 A1* | 7/2009 | Den et al. | 370/401 |
| 2012/0113894 A1* | 5/2012 | Yang et al. | 370/328 |
| 2012/0155325 A1* | 6/2012 | Eichen | H04L 12/4633 370/254 |

FOREIGN PATENT DOCUMENTS

| | | |
|---|---|---|
| EP | 1 916 822 | 4/2008 |
| KR | 10-2006-0047429 | 5/2006 |

OTHER PUBLICATIONS

Yong-Geun Hong, Jung-Soo Park and Hyoung-Jun Kim, "Considerations of multiple network interface for a mobile node," Advanced Communication Technology, 2006. ICACT 2006. The 8th International Conference, Phoenix Park, 2006, pp. 3 pp.-1802.*
A. Famulari and A. Hecker, "Network-Independent Support for Using Multiple IP Interfaces in Applications," Network and Information Systems Security (SAR-SSI), 2011 Conference on, La Rochelle, 2011, pp. 1-10.*
International Search Report for PCT Application No. PCT/US2012/036206, dated Aug. 1, 2012.
Manish Panchmatia: "LTE NAS-3", layers7.blogspot.nl, Jan. 15, 2010, pp. 1-5.
International Preliminary Report on Patentability dated Dec. 27, 2013 Search Report for PCT Application No. PCT/US2012/036206.
Taiwanese Office Action dated May 26, 2014 in corresponding application No. 101119964.
Taiwanese IP Search Report for Application No. 101119964.
Korean Office Action dated Aug. 27, 2014 in corresponding Korean Application No. 10-2013-7032254 with translation.

* cited by examiner

SYSTEM, APPARATUS AND METHOD FOR ADDRESS MANAGEMENT IN A DISTRIBUTED MOBILE CORE NETWORK

BACKGROUND

Typically, in today's third generation (3G) networks, a limited number of centrally placed Gateway GPRS Support Nodes (GGSNs) are used to provide wireless capabilities for users. For example, there may be four GGSNs that provide wireless coverage for the United States, each serving a different coverage area. One of the main functions of a GGSN is that it assigns an internet protocol (IP) address to a mobile device when the mobile device enters into its coverage area. For example, the IP address of the mobile device does not change as it moves throughout the coverage area of one GGSN. However, when the mobile device enters into a new coverage area corresponding to a different GGSN, the new GGSN will assign a new IP address for the mobile device to use. In fourth generation (4G) networks, a public data network gateway (P-GW) maybe used instead of the GGSN to provide IP address assignment.

The conventional method of assigning IP addresses by a centrally located gateway may cause problems relating to reliability and scalability. For example, in terms of reliability, if one of the limited number of central gateways is inoperable, wireless capabilities may be affected for a significant portion of mobile devices. Also, in terms of scalability, when the mobile device enters into a different coverage area that is served by another central gateway, the mobile device will lose connectivity (as it re-configures its new IP address), thereby causing a disruption in service. For some applications of the mobile device such as any type of voice application, the mobile device may lose critical information during such disruptions in service. Furthermore, as internet traffic increases, the centralized solution becomes less practical due to scalability requirements. As a result, some methods use a distributed solution involving more central gateways in order to provide increased scalability. However, the increased number of central gateways may result in further disruptions in service caused by the mobile device receiving a new IP address every time the mobile device enters into a new coverage area.

SUMMARY

Embodiments of the present invention provide a system, apparatus and method for address management in a distributed mobile core network.

The apparatus includes a user equipment for managing multiple addresses for connecting at least one application client of the user equipment to a respective application server via at least one network. The user equipment includes a mobile address unit configured to manage a principal address, a local macro network (LMN) address, and a local area network (LAN) address. The principal address is used for data transmissions of a first type, the LMN address is used for data transmissions of a second type, and the LAN address is used for data transmission of a third type.

In one embodiment, the first type data transmissions have bandwidth below a first threshold level and require constant connectivity, the second type data transmissions have bandwidth above the first threshold level and are susceptible to at least one period of disconnection below a second threshold level, and the third type data transmissions have bandwidth above the first threshold level and are susceptible to at least one period of disconnection above the second threshold level.

The principal address may be assigned by a central gateway serving a first coverage area of a communication network, the LMN address may be assigned by a local central gateway serving a subset area of the first coverage area of the communication network, and the LAN address may be assigned by a wireless local area network (WLAN), where the WLAN is independent from the communication network.

In one embodiment, the user equipment further includes a network driver configured to recognize a change in a state of the at least one network, and a media access controller (MAC). The mobile address unit controls the network driver to inform the MAC of a new address and type of the new address, if the network driver recognizes a change in the state of the at least one network, where the type is one of the principal address, the LMN address and the LAN address.

The mobile address unit controls the MAC to inform the application client of the new address, if the application client has requested this type of address. The mobile address unit controls the application client to perform a domain name server (DNS) lookup for an application server corresponding to the application client, and the application client receives a DNS response that includes an address of the corresponding application server. In this process a network address translation (NAT) and a Port Address Translation (PAT) session may also be setup.

When at least one of the addresses managed by the mobile address unit becomes unavailable, the mobile address unit controls the MAC not to perform any further action if the MAC has another type of address available for the type of data transmission corresponding to the application client, otherwise the mobile address unit controls the MAC to inform the application client that no address is available for the type of data transmission corresponding to the application client.

In another embodiment, if the application client becomes active, the mobile address unit controls the application client to transmit a request to the MAC to obtain at least one of the principal address, LMN address, or the LAN address based on a set priority order and controls the MAC to respond with the obtained at least one address according to the set priority order. If the application client becomes inactive, the mobile address unit controls the application client to de-register with the MAC by indicating which type of address to de-register.

Embodiments also provide a method for managing multiple addresses for connecting at least one application client of a user equipment to a respective application server via at least one network. The method includes managing, by a mobile address unit, a principal address, a local macro network (LMN) address, and a local area network (LAN) address, where the principal address is used for data transmissions of a first type, the LMN address is used for data transmissions of a second type, and the LAN address is used for data transmission of a third type.

In one embodiment, the first type data transmissions have bandwidth below a first threshold level and require constant connectivity, the second type data transmissions have bandwidth above the first threshold level and are susceptible to at least one period of disconnection below a second threshold level, and the third type data transmissions have bandwidth above the first threshold level and are susceptible to at least one period of disconnection above the second threshold level.

The method may further include recognizing, by a network driver, a change in a state of the at least one network, and controlling, by the mobile address unit, the network driver to inform a media access controller (MAC) of the user equipment of a new address and type of the new address, if the network driver recognizes a change in the state of the at least one network, the type being one of the principal address, the LMN address and the LAN address.

The method may further include controlling, by the mobile address unit, the MAC to inform the application client of the new address, if the application client has requested the type of new address, and/or controlling, by the mobile address unit, the application client to perform a domain name server (DNS) lookup for an application server corresponding to the application client, and the application client receives a DNS response that includes an address of the corresponding application server.

The method may further include controlling, by the mobile address unit, the application client to establish one of a network address translation (NAT) and a Port Address Translation (PAT), controlling, by the mobile address unit, the application client to transmit a request to the MAC to obtain at least one of the principal address, the LMN address, and the LAN address based on a set priority order, if the application client becomes active, and controlling, by the mobile address unit, the MAC to respond with the obtained at least one address according to the set priority order.

Embodiments also provide a system for transmitting data using multiple addresses from at least one application client of a user equipment to a respective application server via at least one network. The system includes a central gateway configured to assign a principal address to the user equipment, where the central gateway serves a first coverage area of a communication network and the principal address is used for data transmissions of a first type in the first coverage area, a local central gateway configured to assign a local macro network (LMN) address to the user equipment, where the local central gateway serves a subset area of the first coverage area of the communication network and the LMN address is used for data transmissions of a second type in the subset area, and a wireless local area network (WLAN) configured to assign a local area network (LAN) address to the user equipment, where the WLAN is independent from the communication network.

The system further includes a plurality of serving gateways, where the plurality of serving gateways is connected to the central gateway. In one embodiment, the central gateway and the local central gateway are one of public data network (P-GW) gateways and Gateway GPRS Support Node (GGSN) gateways, and the plurality of serving gateways are one of serving gateways (S-GW) and Serving GPRS Support Node (SGSN) gateways.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user; remote station, access terminal, receiver, etc., and may describe a remote user of wireless resources in a wireless communication network. Examples of the UE include mobile phones, smart phones, computers, gaming devices, or personal digital assistants (PDAs). Some UEs within a wireless communication network may be capable of acting as an access point for other electronic devices. For example, the UE may provide access to the internet for other electronic devices such as computers, gaming devices, or personal digital assistants (PDAs) connected, via a wireless and/or wired connection, to the UE in order to access the Internet via the wireless communications network.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an eNB, serving gate way (S-GW), packet data network gateway (P-GW) illustrated in FIG. 1), or the UE. Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Embodiments of the present application relate to a distributed wireless core network, where multiple IP addresses may be assigned by different network elements to a particular user equipment, and a method and apparatus for managing the multiple IP addresses, at the same time. As such, embodiments of the present application utilize a multiple anchor solution, which allows the IP address for the user equipment to change to another IP address, as the anchor point changes.

At least three different types of IP addresses are managed in the user equipment: a principal address, a local macro network (LMN) address, and a local area network (LAN) address. Each of the three different types of addresses may serve a different type of data transmission.

For example, the principal address may serve data transmissions of a first type. First type data transmissions include traffic that is considered important in terms of maintaining a connection at all times, such as voice or critical internet transactions including financial transactions (e.g. requires non-stop connectivity). Also, the first type data transmissions have relatively low bandwidth (e.g., below a first threshold level). The first threshold level may be arbitrarily selected based on the type of communication system. For example, the differentiation between low bandwidth and high bandwidth is constantly evolving, and is known to one of ordinary skill in the art. The principal address may be an IP address that is completely mobile (e.g., remains connected all the time). In one embodiment, the principal address may be an IPv4 or IPv6 address.

The LMN address may serve data transmissions of a second type. The second type data transmissions have a relatively high bandwidth (e.g., above the first threshold level). Also, the second type data transmissions may be susceptible to small periods of disconnection (e.g., length of the period of disconnection is below a second threshold level). The second threshold level may be arbitrarily selected based on the type of communication system. For example, the differentiation between small periods of disconnection and large periods of disconnection is constantly evolving, and is known to one of ordinary skill in the art. Examples of the second type include data transmissions involving video applications, or various internet access related applications, for example. The LMN address may be an IP address. In one embodiment, the LMN address may be an IPv4 or IPv6 address. In terms of its mobility, the LMN address serves a subset of a coverage area provided by a central gateway, and changes when the user equipment enters into a different subset area.

The LAN address may serve data transmissions of a third type. The third type data transmissions include traffic having a relatively high bandwidth (e.g., above the first threshold level), and these transmissions are able to withstand large intervals of disruption (e.g., length of the period of disconnection is above the second threshold level). However, the LAN address is not served by the core network, and is not mobile. Rather, the LAN address is served by a local area network such as a Wi-Fi™ connection, for example.

In the distributed wireless core, a central gateway assigns the principal address, a local central gateway assigns the LMN address, and a wireless local area network (WLAN) assigns the LAN address. The user equipment includes a mobile address unit for storing and managing each of the above addresses, as further described below.

Figure 1:
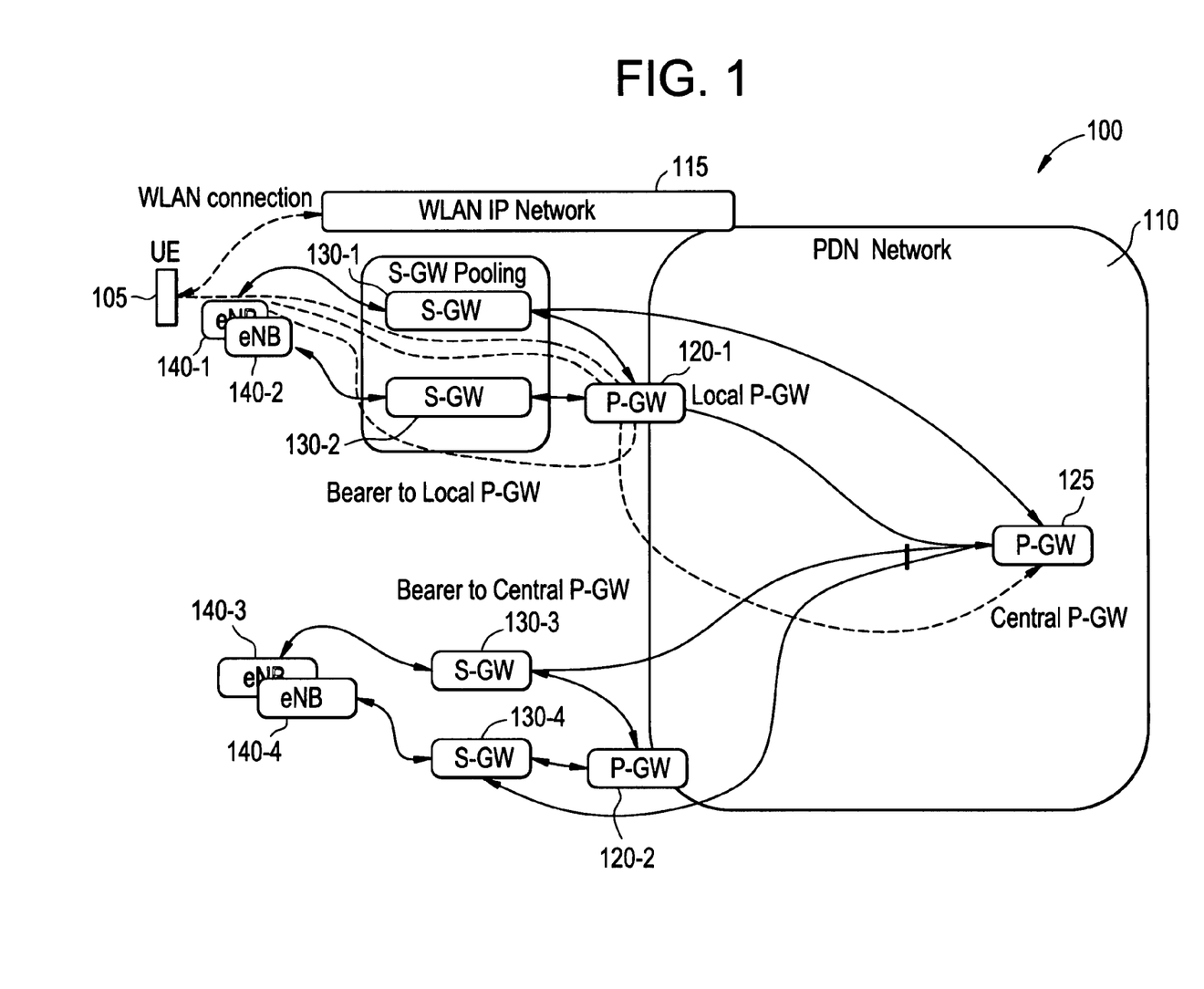
FIG. 1 illustrates a wireless communication system according to an embodiment.

FIG. 1 illustrates a wireless communication system 100 according to an embodiment. FIG. 1 illustrates the wireless communication system 100 using Long Term Evolution (LTE) technologies. However, embodiments of the present application encompass any other type of wireless technology such as Global System for Mobile communications (GSM), Code division multiple access (CDMA), Universal Mobile Telecommunications System (UMTS), and WiMax, among others, for example.

The wireless communication system 100 includes a packet data network 110 (PDN), a wireless local area network (WLAN) 115, a plurality of serving gateways (S-GWs) 130, a plurality of evolved Node Bs (eNBs) 140, and at least one user equipment (UE) 105. The wireless communication system 100 is capable of supporting any type of data transmission (e.g., voice/video/text) between any devices connected to the system. Also, the wireless communication system 100 includes at least one central gateway 125, and multiple local central gateways 120. The central gateway 125, the local central gateways 120 and the serving gateways 130, among other components, may be considered the core network. Though not pictured, the wireless communication system 100 may include other elements including, for example, one or more mobility management entities (MMEs).

The central gateway 125 may be a PDN gateway (P-GW) for 4G/LTE technologies as shown in FIG. 1, a Gateway GPRS Support Nodes (GGSN) for 3G technologies, or any other type of gateway that performs similar functionality. The P-GW and the GGSN may be considered synonymous with each other. For purposes of address management, the P-GW and the GGSN may function in a similar manner to each other. The central gateway 125 serves a first coverage area of the communication network. For example, the central gateway 125 may serve one particular region of the entire PDN network 110. As such, although not shown, the wireless communication system 100 may include a number of distributed central gateways 125.

The central gateway 125 is configured to assign the principal address to the UE 105 when the UE 105 registers with a respective service provider. For example, the central gateway 125 may notify the UE 105 of the principal address via a serving gateway 130 assigned to the central gateway 125 and a respective eNB 140. Techniques for establishing, maintaining, and operating the air interfaces between the UE 105 and the eNB 140, the eNB 140 and the serving gateway 130, the serving gateway 130 and either the local central gateway 120 or the central gateway 125 to provide uplink and/or downlink wireless communication channels between these elements are known in the art and in the interest of clarity only those aspects of establishing, maintaining, and operating the air interfaces that are relevant to the present disclosure will be discussed herein.

Similar to the central gateway 125, the local central gateway 120 may be the PDN gateway (P-GW) for 4G/LTE technologies as shown in FIG. 1, the Gateway GPRS Support Nodes (GGSN) for 3G technologies, or any other type of gateway that performs similar functionality. However, the local central gateway 120 serves a subset of the first coverage area of the central gateway 125. The local central gateway 120 may provide the same functionality as the central gateway 125. However, the local central gateway 120 is configured to assign the local LMN address to the UE 105 when the UE 105 is in the subset coverage area of the local central gateway 120. The local central gateway 120 notifies the UE 105 of the local LMN address via a corresponding serving gateway 130 assigned to the local central gateway 120 and a respective eNB 140.

In FIG. 1, a first local central gateway 120-1 and a second local central gateway 120-2 are illustrated, where each local central gateway 120 serves a different subset area within the first coverage area of the central gateway 125. The first local central gateway 120-1 and the second local central gateway 120-2 are assigned to the central gateway 125. Although only two local central gateways 120 are illustrated in FIG. 1, embodiments encompass any number of local central gateways 120.

A plurality of serving gateways 130 is assigned to the local central gateway 120. Each serving gateway 130 may be a serving gateway (S-GW) for 4G/LTE technologies as shown in FIG. 1, a Serving GPRS Support Node (SGSN) for 3G technologies, or any other type of serving gateway that performs similar functionality. The plurality of serving gateways 130 may be considered a gateway pool for a respective local central gateway 120. As shown in FIG. 1, the plurality of serving gateways 130 may include a first serving gateway 130-1 and a second serving gateway 130-2 communicating with the first local central gateway 120-1, and a third serving gateway 130-3, and a fourth serving gateway 130-4 communicating with the second local central gateway 120-2. However, embodiments encompass any number of serving gateways 130.

One or more eNBs 140 are assigned to each serving gateway 130. The term eNB may be considered synonymous to and/or referred to as a base station (BS), base transceiver station (BTS), NodeB, etc. and may describe equipment that provides the radio baseband functions for data and/or voice connectivity between a network and one or more users. As shown in FIG. 1, a first eNB 140-1 is connected to the first serving gateway 130-1, a second eNB 140-2 is connected to the second serving gateway 130-2, a third eNB 140-3 is connected to the third serving gateway 130-3, and a fourth eNB 140-4 is connected to the fourth serving gateway 130-4. However, embodiments encompass any number of eNBs.

The WLAN 115 is a network where the UE 105 can connect to a local area network (LAN) through a wireless connection. The WLAN 115 is a network separate from the PDN network described above. The WLAN 115 may be connected to a router, cable modem, or Asymmetric Digital Subscriber Line (ADSL) modem for internet access. When the UE 105 enters into the coverage area of the WLAN 115 or connects to the WLAN 115, the WLAN 115 may assign the UE 105 the LAN address. Techniques for establishing, maintaining, and operating the connection between the UE 105 and the WLAN 115 are known in the art and in the interest of clarity only those aspects of establishing, maintaining, and operating these connections that are relevant to the present disclosure will be discussed herein.

According to embodiments, the UE 105 can be connected to the communication system 100 through multiple points. For example, the UE 105 can be connected to the WLAN 115 via the LAN address, the local central gateway 120 via the LMN address, and the central gateway 125 via the principal address at the same time. For example, the UE 105 may store a plurality of applications (e.g., any type of data communication application) that permits data transfer to another wireless entity such as an application server, another UE 105, or any type of device capable of connecting to the wireless communication system 100. Each application of the UE 105 may use one of the LAN address, the principal address, and the LMN address to connected to its respective application server via the wireless communication system 100 depending on the application's preferences, as further explained below.

Figure 2:
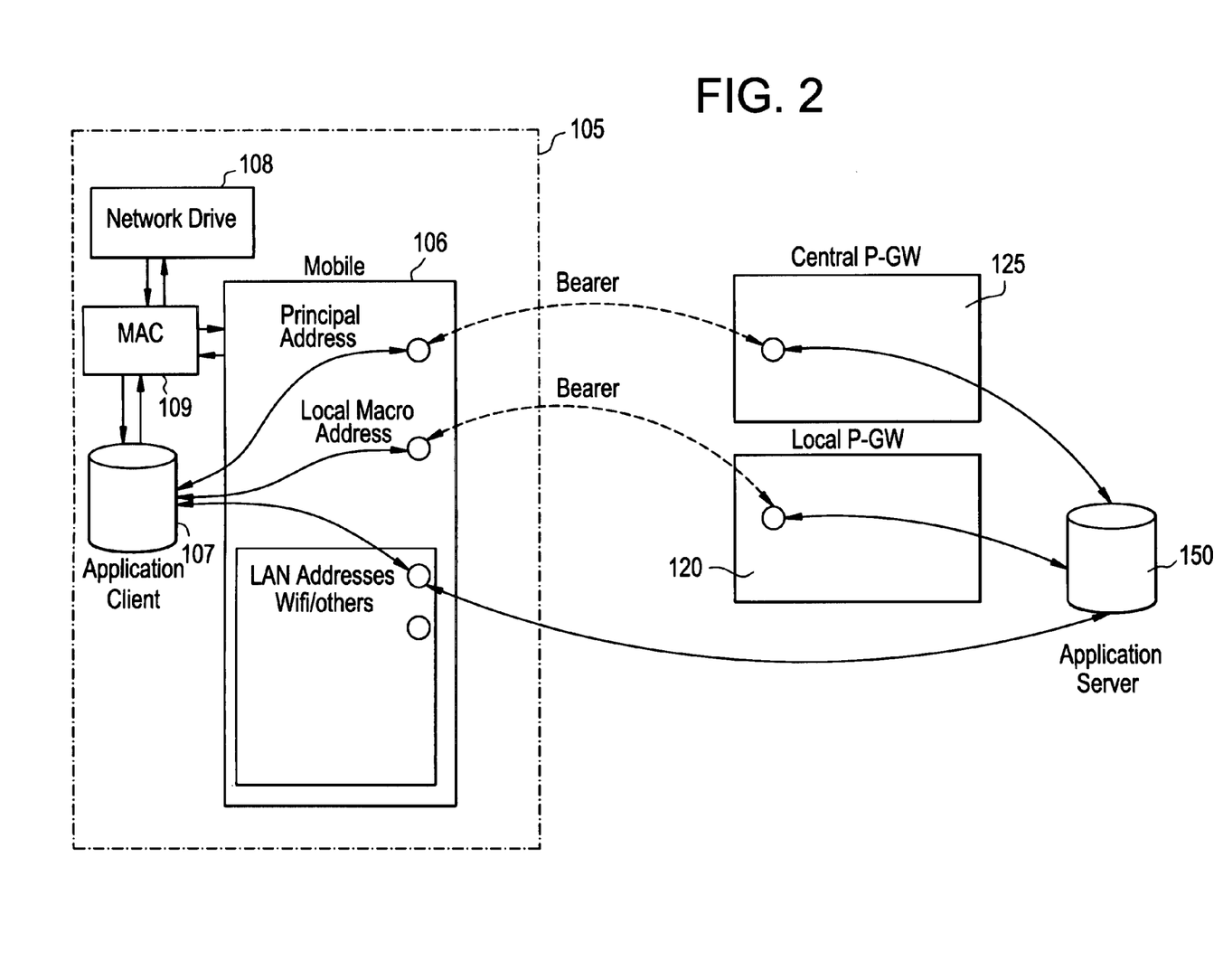
FIG. 2 illustrates a graphical view of a mobile address unit according to an embodiment.

FIG. 2 illustrates a graphical view of a mobile address unit according to an embodiment. FIG. 2 illustrates the UE 105 including an application client 107 and a mobile address unit 106 configured to manage the principal address, the LMN address, and the LAN address. The mobile address unit 106 may include at least one processor, and a memory unit for storing the IP addresses and program codes that provide instructions for the at least one processor to carry out the functions described in the present disclosure. The application client 107 communicates with its corresponding application server 150 using one of the principal address, the LMN address and the LAN address stored in the mobile address unit 106. Although FIG. 2 illustrates the UE 105 as including only one application, the mobile address unit 106 may manage the principal address, the LMN address, and the LAN address for any number of applications stored on the UE 105. Also, the UE 105 includes a network driver 108 for controlling the connections to the various network elements, and a media access controller (MAC) 109 for providing addressing and channel access control mechanisms that make it possible for several network nodes to communicate within a multi-point network. The network driver 108 and the MAC 109 are well known components to one of ordinary skill in the art. Also, the UE 105 may include other components that are well known to one of ordinary skill in the art.

The mobile address unit 106 may store and manage one or more of the principal address, the LMN address and the LAN address in the mobile address unit 106. For example, the central gateway 125 assigns the UE 105 the principal address when the UE 105 registers with a service provider, or enters into the first coverage area served by the central gateway 125. Then, the mobile address unit 106 stores the principal address. When the UE 105 enters into a subset coverage area served by the local central gateway 120, the local central gateway 120 assigns the UE 105 a corresponding LMN address. The mobile address unit 106 subsequently stores the LMN address. As such, if the mobile address unit 106 enters into a different subset coverage area served by another local central gateway 120, the UE 105 receives a different LMN address corresponding to the new local central gateway 120. The mobile address unit 106 subsequently updates the old LMN address with the new LMN address. Also, if the UE 105 enters into a coverage area served by the WLAN 115 and connects to the WLAN 115, the UE 105 receives the LAN address. The mobile address unit 106 then stores the WLAN address.

Depending on the preferences of the application client 107, the application client 107 may use the principal address or the LMN address. Also, if the mobile address unit 106 also includes the LAN address, the application client 107 may use the principal address, the LMN address, or the LAN address. The application client 107 may have pre-set preferences indicating which type of address the application client 107 prefers to use. The preferences are pre-set based on the type of data transmissions used by the application client. The order of addresses may be considered the set priority order. For example, if the application client 107 is a voice application, the application client 107 may use only the principal address. If the application client 107 is a video streaming application, the application client 107 may use the LMN address. In addition, if the UE 105 is connected to the WLAN 115 and the mobile address unit 106 includes the LAN address, the application client 107 may prefer to use the LAN address over the LMN address. The application client 107 is preprogrammed to acquire one of more of the above addresses for a particular type of data transmission (e.g., first type, second type or third type). If the UE 105 includes multiple application clients 107, two or more addresses may be used at the same time to connect to the wireless communication system 100.

Figure 3:
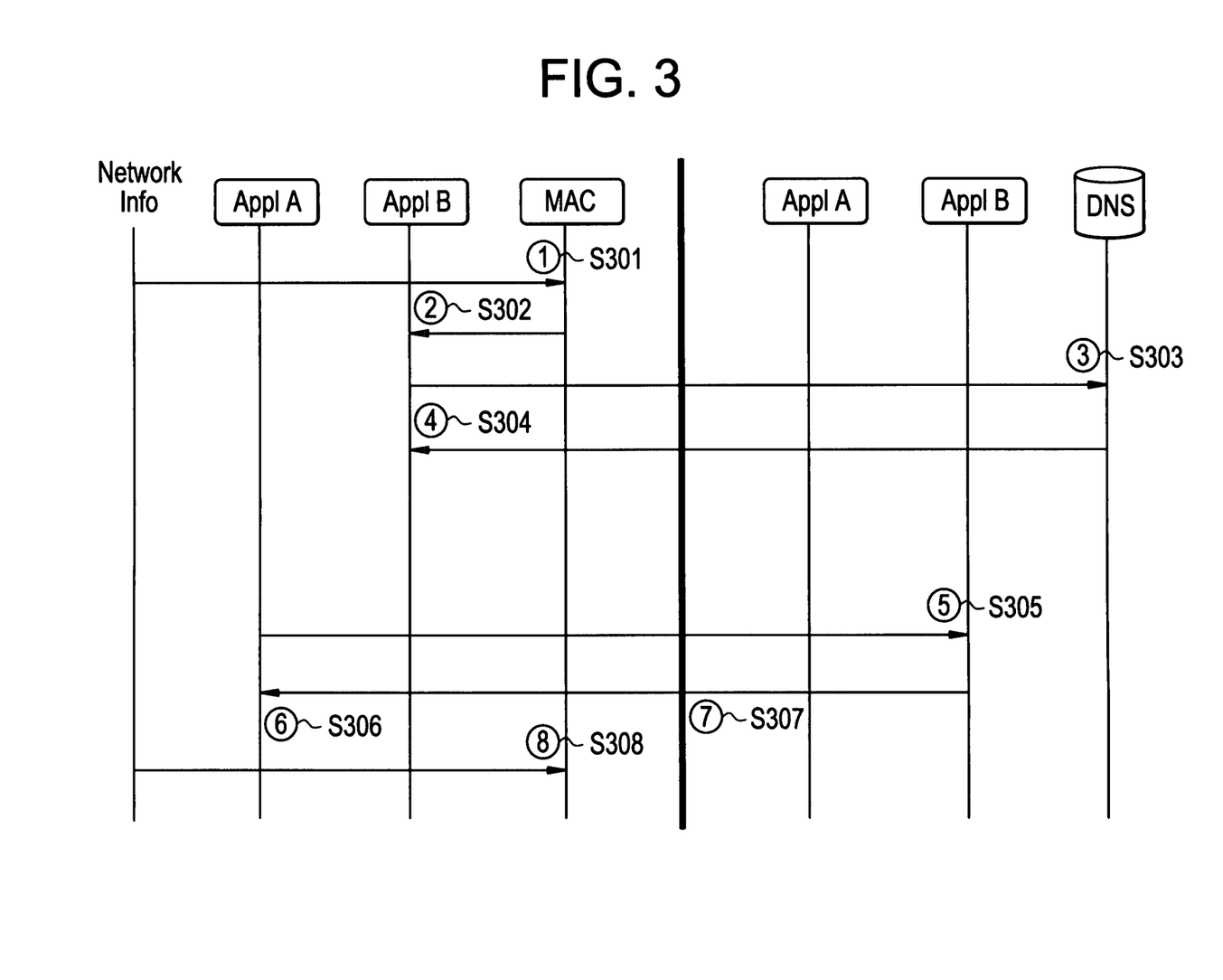
FIG. 3 illustrates a flow diagram illustrating how the mobile address unit manages the multiple addresses when there is a change in the state of the network according to an embodiment.

FIG. 3 illustrates a flow diagram illustrating how the mobile address unit 106 manages the multiple addresses when there is a change in the state of the network according to an embodiment of the present application.

In step S301, the network driver 108 of the UE 105 recognizes a new network such as the WLAN 115 or a new network corresponding to the local central gateway 120. For example, if the UE 105 enters into a new subset coverage area of the local central gateway 120, the network driver 108 of the UE 105 recognizes the new network. Also, if the UE 105 enters into a coverage area served by the WLAN 115, the network driver 108 of the UE 105 recognizes the WLAN 115. Thereafter, the UE 105 and the newly found network initiate authentication procedures according to methods that are well known to one of ordinary skill in the art, and the UE 105 becomes connected to the recognized network. According to embodiments, the mobile address unit 106 controls the network driver 108 to inform the MAC 109 of the new address and the type of new address—the principal address, the LMN address, or the LAN address.

In step S302, the mobile address unit 106 controls the MAC 109 to inform each application client 107 that has requested that type of address. For example, as explained above, the application client 107 may have preferences for a type of address that becomes available. In FIG. 3, application B has already registered with the mobile address unit 106 (registration is explained with reference to FIG. 4), and is informed of the requested address.

In step S303, the mobile address unit 106 controls the application client 107 (e.g., application B) to perform a domain name server (DNS) lookup for an application server 150 corresponding to the application client 107. This may be necessary if the application client 107 was communicating with a application server 150 having a particular URL. This server may change if the local gateway changes—so a new DNS lookup may be required.

In step S304, the application client 107 receives a DNS response that includes the address of the application server 150 in response to the DNS request. The DNS request-response may be performed according to any known methods. In step S305, the mobile address unit 106 controls the application client 107 to transmit a message to the application server 150. In step S306, the application server 150 responds to the transmitted message with an acknowledgement. This is necessary to setup any Network Address Translation (NAT) or Port Address Translation (PAT) flows in access networks, as further described below.

In step S307, the NAT and/or PAT exchange may be performed for any communication exchange between the application client 107 and the application server 150. For example, step S307 may be applied to any of the communication exchanges between the application 107 and the application server 150 such as steps S303, S304, S305 and S306, for example. The performance of the NAT/PAT exchange may be accomplished through any known techniques.

In step S308, when a network is no longer available, the network driver 108 of the UE 105 transmits a message to the MAC 109 informing the MAC 109 of the unavailable network. If the MAC 109 has another type of address available for that type of traffic (e.g., the MAC 109 has already informed the applications in step S302), the mobile address unit 106 controls the MAC 109 to not perform any further action. Otherwise, if no other address is available for that type of traffic, the mobile address unit 106 controls the MAC 109 to inform the application client 107 that no address is available for that type of traffic.

Figure 4:
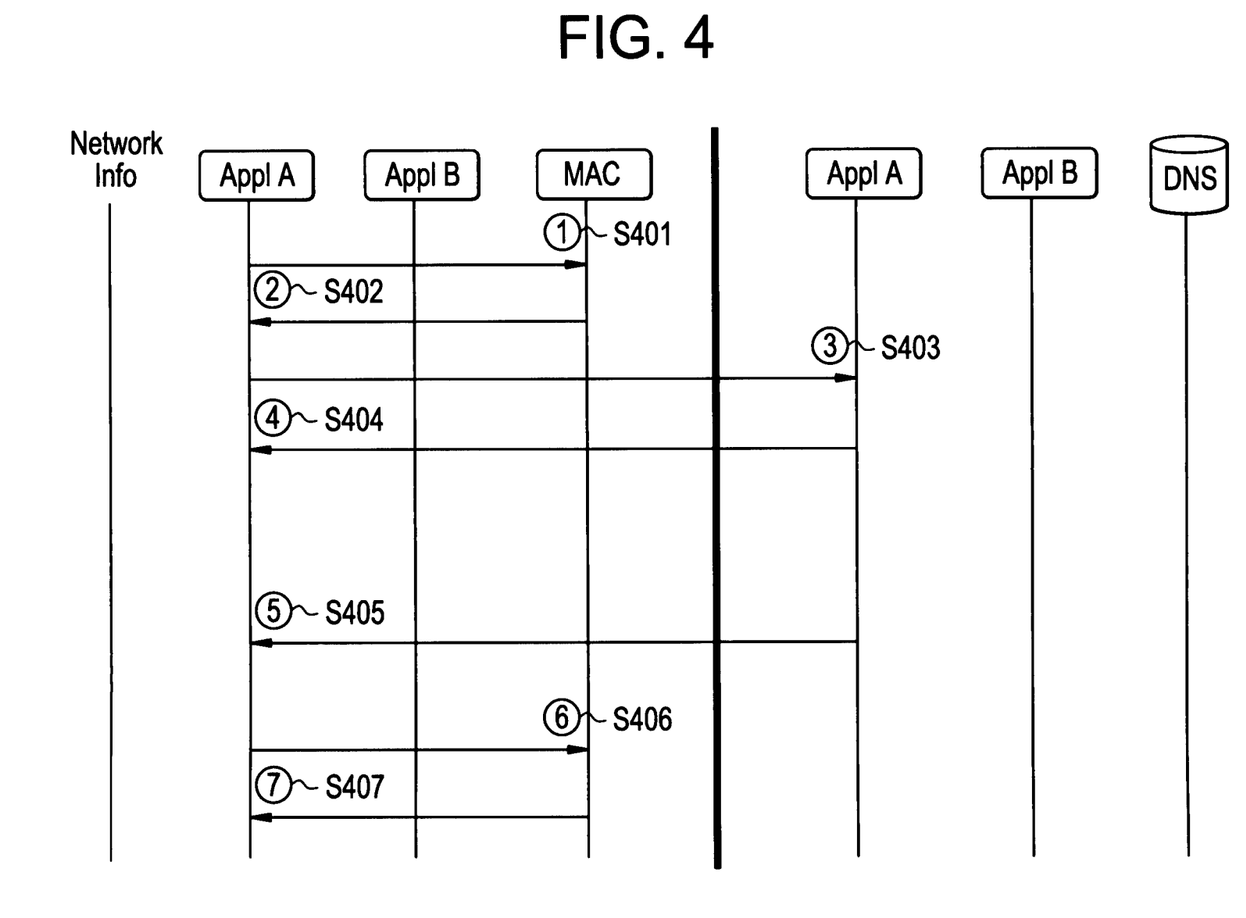
FIG. 4 illustrates a flow diagram illustrating how the mobile address unit manages the multiple addresses when there is a change in the state of the application according to an embodiment.

FIG. 4 illustrates a flow diagram illustrating how the mobile address unit 106 manages the multiple addresses when there is a change in the state of the application according to an embodiment of the present application.

Steps S401, S402, S403 and S404 of FIG. 4 illustrate a registration process, while steps S405, S406 and S407 illustrate a de-registration process.

In step S401, when a change occurs in the operational state of the application client 107 such as when the application client 107 becomes active, the mobile address unit 106 controls the application client 107 (e.g., application A in FIG. 4) to transmit a request to the MAC 109 in order to obtain an optimal IP address (e.g., principal address, LMN address, or LAN address) for the type of data transmission the application client 107 handles, based on the application client's set priority order. For example, as indicated above, the application client 107 has a set priority order for the type of data transmission the application handles. If the application client 107 is a video streaming application, the application client 107 may prefer the LAN address (if it is available), and then the LMN address (if the LAN address is not available). Therefore, when the operational state of the application client 107 becomes active, the mobile address unit 106 controls the application client 107 to transmit a request to the MAC 109 to obtain the address according to its set priority order.

In step S402, the mobile address unit 106 controls the MAC 109 to respond with the address according to the application's priority order. In step S403, the mobile address unit 106 controls the application client 107 to transmit a loopback message to the application server 150 in order to setup the NAT/PAT exchange. In step S404, the application server 150 responds with a message back to the application client 107.

If the operational state of the application client 107 changes from the active state to the inactive state, the mobile address unit 106 controls the application client 107 to de-register with the MAC 109.

In step S405, the application server 150 informs the application client 107 to de-register with the MAC 109. In step S406, the mobile address unit 106 controls the application client 107 to de-register with the MAC 109. For example, the application client 107 transmits a message to the MAC 109 indicating which type of address to de-register. In its message to the MAC 109, the application client 107 may inform the MAC 109 to de-register with one or more address (e.g., any combination of the principal address, the LMN address, and the LAN address, or all of them). In step S407, the mobile address unit 106 controls the MAC 109 to transmit an acknowledgement message.

Embodiments provide a classification of addresses into the principal address, the LMN address, and the LAN address, which correspond to different network elements. The mobile address unit provides address management, which interfaces with the applications stored on the user equipment, and informs the applications of network address related changes. Because the assignment of these addresses utilizes a distributed system, the cost of building the mobile network can be distributed throughout the network.

Variations of the example embodiments are not to be regarded as a departure from the spirit and scope of the example embodiments, and all such variations as would be apparent to one skilled in the art are intended to be included within the scope of this disclosure.

What is claimed:

1. A user equipment comprising:
a media access controller (MAC); and
a memory having computer readable instructions stored thereon; and
at least one processor configured to execute the computer readable instructions to,
manage, via at least one network, multiple addresses for connecting at least one application client of the user equipment to an application server, and
control a mobile address unit, the mobile address unit configured to,
manage a principal address, a local macro network (LMN) address, and a local area network (LAN) address, the principal address for associating with a central gateway serving a first coverage area and for data transmissions of a first type, the LMN address for associating with a local central gateway serving a subset area of the first coverage area and data transmissions of a second type, the LAN address being used for data transmission of a third type, and
use at least one of the principal address, the LMN address, or the LAN address according to a set priority order, the set priority order indicating an order of data transmission types preferred for an application of the user equipment, the set priority order being based on an application type of the application such that the use of at least one of the principal address, the LMN address, or the LAN address, is dependent on the application type of data being transmitted over the at least one of the principal address, the LMN address, or the LAN address,
wherein when at least one of the addresses managed by the mobile address unit becomes unavailable, the mobile address unit is configured to control the MAC not to perform any further action if the MAC has another type of address available for the type of data transmission corresponding to the application client, otherwise the mobile address unit is configured to control the MAC to inform the application client that no address is available for the type of data transmission corresponding to the application client.

2. The user equipment of claim 1, wherein the first type data transmissions have bandwidth below a first threshold level and require constant connectivity, the second type data transmissions have bandwidth above the first threshold level and are susceptible to at least one period of disconnection below a second threshold level, the third type data transmissions have bandwidth above the first threshold level and are susceptible to at least one period of disconnection above the second threshold level.

3. The user equipment of claim 1, wherein the principal address for communication with the central gateway serving the first coverage area of a communication network, the LMN address for communication with the local central gateway serving the subset area of the first coverage area of the communication network, and the LAN address for communication with a wireless local area network (WLAN), the WLAN being independent from the communication network.

4. The user equipment of claim 1, wherein
the at least one processor includes a network driver, the network driver is configured to recognize a change in a state of the at least one network, and
the mobile address unit is configured to control the network driver to inform the MAC of a new address and type of the new address, if the network driver recognizes a change in the state of the at least one network, the type being one of a group consisting of the principal address, the LMN address and the LAN address.

5. The user equipment of claim 4, wherein the mobile address unit is configured to control the MAC to inform the application client of the new address, if the application client has requested the type of new address.

6. The user equipment of claim 5, wherein
the mobile address unit is configured to control the application client to perform a domain name server (DNS) lookup for an application server corresponding to the application client, and
the application client is configured to receive a DNS response that includes an address of the corresponding application server.

7. The user equipment of claim 6, wherein the mobile address unit is configured to control the application client to establish one of a group consisting of a network address translation (NAT) and a Port Address Translation (PAT).

8. The user equipment of claim 1,
wherein if the application client becomes active, the mobile address unit is configured to control the application client to transmit a request to the MAC to obtain at least one of a group comprising the principal address, the LMN address, and the LAN address based on the set priority order and to control the MAC to respond with the obtained at least one address according to the set priority order.

9. The user equipment of claim 8, wherein if the application client becomes inactive, the mobile address unit is configured to controls the application client to de-register with the MAC by indicating which type of address to de-register.

10. A method for managing multiple addresses for connecting at least one application client of a user equipment to a respective application server via at least one network, the method comprising:
managing, by at least one processor, a principal address, a local macro network (LMN) address, and a local area network (LAN) address, the principal address for associating with a central gateway serving a first coverage area and for data transmissions of a first type, the LMN address for associating with a local central gateway serving a subset area of the first coverage area and for data transmissions of a second type, the LAN address being used for data transmission of a third type;

using, by the at least one processor, at least one of the principal address, the LMN address, or the LAN address according to a set priority order, the set priority order indicating an order of data transmission types preferred for an application of the user equipment, the set priority order being based on an application type of the application such that the use of at least one of the principal address, the LMN address, or the LAN address, is dependent on the application type of data being transmitted over the at least one of the principal address, the LMN address, or the LAN address; and controlling, by the at least one processor, a media access controller (MAC) not to perform any further action, when at least one of the addresses managed by the at least one processor becomes unavailable, if the MAC has another type of address available for the type of data transmission corresponding to the application client, otherwise controlling the MAC to inform the application client that no address is available for the type of data transmission corresponding to the application client.

11. The method of claim 10, wherein the first type data transmissions have bandwidth below a first threshold level and require constant connectivity, the second type data transmissions have bandwidth above the first threshold level and are susceptible to at least one period of disconnection below a second threshold level, the third type data transmissions have bandwidth above the first threshold level and are susceptible to at least one period of disconnection above the second threshold level.

12. The method of claim 10, further comprising:
recognizing, by the at least one processor, a change in a state of the at least one network; and
controlling, by the at least one processor, to inform the media access controller (MAC) of the user equipment of a new address and type of the new address, if the network driver recognizes a change in the state of the at least one network, the type being one of a group consisting of the principal address, the LMN address and the LAN address.

13. The method of claim 12, further comprising:
controlling, by the at least one processor, the MAC to inform the application client of the new address, if the application client has requested the type of new address.

14. The method claim 13, further comprising:
controlling, by the at least one processor, the application client to perform a domain name server (DNS) lookup for an application server corresponding to the application client, wherein the application client receives a DNS response that includes an address of the corresponding application server.

15. The method of claim 14, further comprising:
controlling, by the at least one processor, the application client to establish one of a group consisting of a network address translation (NAT) and a Port Address Translation (PAT).

16. The method of claim 15, further comprising:
controlling, by the at least one processor, the application client to transmit a request to the MAC to obtain at least one of a group consisting of the principal address, the LMN address, and the LAN address based on the set priority order, if the application client becomes active; and controlling, by the at least one processor, the MAC to respond with the obtained at least one address according to the set priority order.

17. A system comprising:
a user equipment (UE) including,
a first memory having computer readable instructions stored thereon, and
at least one first processor configured to execute the computer readable instructions stored on the first memory to transmit data, via at least one network, using multiple addresses from at least one application of the user equipment (UE) to an application server,
a media access controller (MAC), and
a mobile address unit, the mobile address unit including,
a second memory having computer readable instructions stored thereon, and
at least one second processor configured to execute the computer readable instructions stored on the second memory to,
manage (i) a principal address for associating with a central gateway, (ii) a local macro network (LMN) address for associating with a local central gateway, and (iii) a local area network (LAN) address for associating with a wireless local area network (WLAN), and
use at least one of the principal address, the LMN address, or the LAN address according to a set priority order, the set priority order indicating an order of data transmission types preferred for an application of the user equipment, the set priority order being based on an application type of the application such that the use of at least one of the principal address, the LMN address, or the LAN address, is dependent on the application type of data being transmitted over the at least one of the principal address, the LMN address, or the LAN address, and
wherein when at least one of the addresses managed by the mobile address unit becomes unavailable, the mobile address unit is configured to control the MAC not to perform any further action if the MAC has another type of address available for the type of data transmission corresponding to the application client, otherwise the mobile address unit is configured to control the MAC to inform the application client that no address is available for the type of data transmission corresponding to the application client;

the wireless local area network (WLAN) including at least one device including a third memory having computer readable instructions stored thereon, and at least a third processor configured to execute the computer readable instructions stored on the third memory to assign a local area network (LAN) address to the UE, the WLAN being independent from the communication network;

the central gateway including a fourth memory having computer readable instructions stored thereon, and at least a fourth processor configured to execute the computer readable instructions stored on the fourth memory to assign the principal address to the UE, the central gateway serving a first coverage area of a communication network, the principal address being used for data transmissions of a first type in the first coverage area; and the local central gateway including a fifth memory having computer readable instructions stored thereon, and at least a fifth processor configured to execute the computer readable instructions on the fifth memory to assign a local macro network (LMN) address to the UE, the local central gateway serving a subset area of the first coverage area of the communication network, the LMN.

18. The system of claim 17, further comprising:
a plurality of serving gateways, the plurality of serving gateways being connected to the central gateway.

19. The system of claim 17, wherein the central gateway and the local central gateway are one of a group consisting of public data network (P-GW) gateways and Gateway GPRS Support Node (GGSN) gateways, and a plurality of serving gateways are one of a group consisting of serving gateways (S-GW) and Serving GPRS Support Node (SGSN) gateways.

* * * * *